Patented June 7, 1949

UNITED STATES PATENT OFFICE 2,472,610

DISTILLATION OF OLEFIN-HYDROGEN CHLORIDE MIXTURES

Alan C. Nixon, Berkeley, David C. Lehwalder, Oakland, and Harry A. Cheney, Berkeley, Calif., assignors to Shell Development Company, San Francisco, Calif., a corporation of Delaware No Drawing. Application November 17, 1947, Serial No. 786,544

8 Claims. (Cl. 202—57)

This invention relates to the separation of hydrogen halide from mixtures comprising the hydrogen halide in admixture with an olefinic hydrocarbon. The invention relates more particularly to the separation on a practical scale of hydrogen chloride from mixtures comprising hydrogen chloride in admixture with a normally gaseous olefinic hydrocarbon. A particular aspect of the invention relates to the separation on a practical scale of hydrogen chloride from mixtures comprising hydrogen chloride and propylene by fractioning means.

Mixtures comprising hydrogen halide in admixture with olefinic hydrocarbons generally constitute a considerable proportion of the materials separated from the reaction products obtained in processes involving the interaction of olefinic hydrocarbons with a halogen or a halogen halide or the treatment of olefinic hydrocarbons in the presence of a halogen or a halogen halide. In processes such as, for example, those wherein an olefinic hydrocarbon reacts with, or is treated in the presence of, chlorine or hydrogen chloride, or organic halides are subjected to catalytic or thermal decomposition, mixtures comprising unconverted charge material or reaction products consisting essentially of hydrogen chloride and olefinic hydrocarbons are generally obtained in the product separating zone of the system in such quantities that the practicability of the operation is often dependent upon the efficient recovery of the components of these mixtures in a condition suitable for further utilization. Thus in the chlorination of a normally gaseous hydrocarbon such as, for example, propylene, there is obtained a mixture consisting essentially of propylene and hydrogen chloride in considerable amount. Methods heretofore employed to effect the recovery of the substantial quantities of hydrogen chloride thus produced comprise such methods as the contacting of the mixture with water thereby recovering the hydrogen chloride as aqueous hydrogen chloride. Many of the processes employing hydrogen chloride as a reactant or treating material necessitate its utilization in the anhydrous or substantially anhydrous state, however. Recovery of the hydrogen chloride by methods involving its contact with substantial amounts of water therefore necessitate the additional complex and costly steps of dehydrating the aqueous product. Methods enabling the efficient separation of the hydrogen chloride from admixture with olefinic hydrocarbons in anhydrous or substantially anhydrous condition are therefore not only desirable but are often essential to bring the processes in which the mixture comprising it is produced within the realm of practicability.

Separation of the hydrogen halide by large scale fractionating means has heretofore generally been impractical because of the relative ease with which the olefinic hydrocarbon combines with the hydrogen halide under fractionating conditions employed resulting in the formation of addition products of the hydrogen halide and the olefinic hydrocarbon. This is particularly the case when fractionation is carried out at the relatively high pressures which must be resorted to, in order to obtain overhead product consisting essentially only of hydrogen halide from mixtures comprising the hydrogen halide in admixture with a normally gaseous olefin such as, for example, propylene. The following example is illustrative of the relative ease with which a hydrogen halide and a normally gaseous olefin will undergo the addition reaction under fractionating conditions of relatively elevated pressure in a column wherein the mixture undergoing fractionation is in contact with a steel surface such as that generally found in practical scale fractionating equipment.

Example I

A propylene-hydrogen chloride mixture is subjected to fractionation in a steel column containing a packing of 0.5 inch mild steel rings. Operating conditions employed, conversion of hydrogen chloride and rate of isopropyl chloride production encountered within the column are indicated in the following table:

Distillation pressure lbs./sq. in./gauge_____ 175
Top temperature °C_____ —25
Reboiler temperature °C_____ 30
Total feed rate lbs./hr._____ 120
HCl content of feed, mol per cent_____ 15
Water in feed—parts per million_____ 70 to 200
Duration—hrs. _____ 27
Isopropyl chloride production rate lbs./hr.__ 13
HCl conversion, per cent_____ 38

This represents an overall production of isopropyl chloride of approximately 44 lbs. per 1000 sq. ft. of steel surface per hour.

It is apparent from the foregoing example that the considerable loss of material charged to the fractionating column occasioned by its conversion to isopropyl chloride renders impractical recourse to such an expedient for recovering the components of the hydrogen chloride-propylene mixture. The impracticality of the method is further evidenced by the rapid increase in the rate of the addition reaction with increase of temperature under such fractionating conditions. Thus the execution of the above fractionation at a column temperature of only about 10° C. higher than that of the example, occasioned by the use of a column pressure of 220 pounds instead of 175 pounds, results in a threefold increase in the rate of isopropyl chloride production.

Although the interaction of hydrogen halide and the olefin proceeds at a relatively low rate when the fractionation is effected in glass apparatus, such material is obviously not suited as a material of construction for equipment to be used in practical scale operation. It has now been found, however, that a hydrogen halide, such as hydrogen chloride, can be separated efficiently from mixtures comprising it in admixture with a normally gaseous olefin such as, for example, propylene, by fractionation on a practical scale when the fractionation is effected in a fractionating zone wherein substantially all surfaces in contact with the mixture undergoing fractionation consist essentially of nickel. It has been found that the utilization of a fractionating zone affording a contact of substantially only a nickel surface with the materials undergoing fractionation enables the utilization of the high pressures and corresponding relatively high temperatures necessary to the attainment of an overhead consisting essentially only of hydrogen halide, with the loss of only a relatively minor amount of the materials charged due to interaction of the components thereof within the fractionating zone.

The exceedingly low rate of reaction of hydrogen chloride and propylene in the liquid phase in the presence of nickel as compared to that unavoidably obtained in the presence of a surface of readily available materials of construction other than nickel is evidenced by the following example:

Example II 300 cc. glass vessels are immersed in an ice bath and connected to a pressure gauge. Approximately equal quantities of HCl and propylene are charged to the vessels, filling about 80% of their total volume. The effect of various materials of construction upon the reaction rate of the hydrogen chloride-propylene addition reaction is obtained by placing a suitable quantity of construction material in each of the vessels below the surface of the liquid therein. The rate of reaction of HCl and propylene is found by determining the amount of reaction products formed and by noting the rate of decrease of the pressure in the vessel. With the second method it is observed that when the reciprocal of absolute pressure is plotted against time, the points fall along a straight line. The slope of this line is a measure of the reaction rate.

In the following table are indicated for each test, the nature and surface area of construction material tested, the initial HCl concentration, the duration of the test, the amount of isopropyl chloride formed in per cent of total charge, and the rate of reaction of HCl and propylene relative to the rate in the presence of glass alone.

stantial interaction of the hydrogen chloride and the propylene in contrast to the effect exerted by the surfaces of the materials of construction compared therewith, but it indicates the inability of deducing such quality from that which is known of the relative behavior of this material and the materials compared therewith as catalysts, anti-corrosion materials, etc. The high degree of efficiency with which hydrogen chloride may be separated on a practical scale from a normally gaseous olefin admixed therewith in accordance with the invention by fractionating such mixture in a fractionating zone affording contact of substantially only nickel surfaces with the material undergoing fractionation is illustrated by the following example:

Example III

Fractionation of a propylene-hydrogen chloride mixture containing approximately 28 per cent by weight of hydrogen chloride in a 40 plate, nickel-clad fractionating column at a pressure of 225 lbs. results in an overhead product consisting essentially of 99.25% by weight of hydrogen chloride and bottoms containing 97% by weight of propylene and 0.35% by weight of isopropyl chloride. About 750 lbs. per day of isopropyl chloride is produced representing a conversion of hydrogen chloride to isopropyl chloride of 0.5%. Execution of the fractionation in a fractionation column presenting a surface of mild steel to the material undergoing fractionation under otherwise substantially identical conditions results in the production of about 15,000 lbs. of isopropyl chloride per day, representing a conversion of hydrogen chloride to isopropyl-chloride of 10%. Utilization of a fractionating column wherein the surface in contact with the material undergoing fractionation is nickel reduces the undesired isopropyl chloride production to only about $1/20$ of that obtained in a steel column under otherwise substantially identical conditions.

In the execution of the invention the presence of any substantial amount of water in the hydrogen halide-olefin mixture charged to the fractionating zone is preferably avoided. If necessary the mixture to be fractionated may be subjected to suitable dehydrating means to remove at least the greater amount of any water contained therein prior to its passage to the fractionating zone. Suitable dehydrating means comprise any of the available conventional drying methods as, for example, the passage of the mixture through a bed of a suitable dehydrating agent such as adsorptive alumina, calcium chloride, calcium sulfate or the like. It has been found, however, that though the presence of any substantial

| Run No. | Surface Present | Area of Surface, Sq. In. | Conc. of HCl mole, per cent | Time, Hours | Isopropyl Chloride formed, per cent | Reaction Rate relative to glass per sq. in. of surface |
|---|---|---|---|---|---|---|
| 1-A | Glass | 45 | 32.4 | 17.2 | 4 | 1 |
| 1-B | do | 185 | 60.8 | 22 | 25 | 1 |
| 2 | Nickel | 7 | 45.2 | 19 | 12 | 6 |
| 3 | Stainless Steel | 7 | 44.8 | 19.5 | 30 | 105 |
| 4 | K-monel | 6 | 49.3 | 46 | 58 | 115 |
| 5 | Low Carbon Steel | 6 | 46.2 | 19.5 | 35 | 180 |
| 6 | Copper | 7 | 46 | 48 | 85 | 230 |
| 7 | Furfural Karbate [1] | 7 | 53.3 | 18 | | 300 |
| 8 | Rusty Iron | 37 | 55.4 | 17 | 83 | 475 |
| 9 | Ferric Chloride | (1% by weight) | 35.5 | 48 | 96 | (145) |

[1] Graphite base with furfural resin binder.

Not only does the foregoing example evidence the unusual degree to which the nickel surface possesses the quality of failing to bring about subamount of water in the feed to the fractionating zone is to be avoided, the removal of substantially all of the last traces of moisture from the feed, resulting in the utilization of a feed approaching absolute dryness, greatly increases the rate of reaction of the hydrogen halide with the olefin in the fractionating zone over that prevailing when traces of moisture, ranging for example from about 20 to about 700 parts per million by weight of the total charge, are present. The increase in the rate of interaction of hydrogen chloride and propylene under fractionating conditions resulting from removal of the last traces of moisture from the charge is illustrated by the following example:

Example IV

The effect of moisture on the hydrochlorination of propylene in the presence of a nickel surface is determined by immersing a nickel vessel in a thermostatically controlled bath maintained at a temperature of 0° C. The vessel is filled half full with liquid propylene. Moisture content of the propylene is determined by analysis of propylene removed from the test vessel after charging. Hydrogen chloride, the moisture content of which is determined, is thereupon introduced into the vessel and the vessel sealed. After a recorded period of time the production rate of isopropyl chloride is determined. The operation is repeated in seven additional operations. In three tests where moisture contents of less than 20 parts per million were attained (operations Nos. 1, 2, and 6), drying of the propylene charge is accomplished in liquid phase with phosphorus pentoxide. In operations Nos. 1 and 6, the limit of sensitivity of the analytical method (4 to 8 P. P. M.) is reached; i. e., no moisture can be detected with certainty. The water content of the propylene charge, the concentration of the hydrogen chloride, the duration of the test in hours, and the rate of isopropyl chloride production in terms of lbs. of isopropyl chloride produced per 1000 sq. ft. of surface per hour, are indicated for each test in the following table:

| Operation No. | Water Content of Propylene, P. P. M. | HCl Conc. percent m. | Duration, Hours | Isopropyl Chloride Production Rate |
|---|---|---|---|---|
| 1 | 7 | 50 | 20 | 46 |
| 2 | 13 | 50 | 17 | 22 |
| 3 | 30 | 52 | 18 | 16 |
| 4 | 38 | 51 | 18 | 16 |
| 5 | 76 | 48 | 24 | 16 |
| 6 | 4 | 17 | 61 | 19 |
| 7 | 30 | 19 | 11 | 3.0 |
| 8 | 53 | 24 | 17 | 3.8 |

As evidenced by the foregoing example the removal of the last traces of moisture to a degree where the charge approaches absolute dryness, that is, for example, having a moisture content of less than 20 parts per million, will increase the isopropyl chloride production rate to as much as about three times, and higher, that encountered within the column when the moisture content ranges above 20, and up to 76 parts per million. In the preferred method of execution of the invention traces of moisture in excess of about 20 parts per million are maintained in the charge to the fractionating zone. The moisture content of the charge to the fractionating zone is preferably maintained in the range of from about 20 to about 700, and still more preferably in the range of from about 20 to about 200 parts per million by weight. Maintenance of the water content within the preferred limits in the preferred method of effecting the fractionation may be obtained by judicious control of the charge dehydrating means employed and/or by the addition of water to the charge prior to its passage into the fractionating zone.

The inclusion of such controlled quantity of water in the charge in combination with the use of a fractionating zone wherein the surfaces in contact with material undergoing fractionation consist essentially only of nickel, therefore provide a means of effecting the desired hydrogen halide separation with an unusually high degree of efficiency.

The following example is illustrative of the substantial advantages which may be obtained in practical scale operation of the process by the maintenance of traces of moisture in the charge to the fractionating zone.

Example V

A mixture of propylene and hydrogen chloride containing 15 mol per cent of hydrogen chloride, and water ranging from 70 to 200 parts by weight of the total feed, is fractionated in a steel column of 3.5 ft. diameter containing 30 steel bubble cap decks. A feed rate of 82 pound-mols per hour and a column pressure of 220 pounds per square inch gauge are employed. The result in terms of isopropyl chloride production and hydrogen chloride conversion within the column are indicated in column A of the following table. The operation is repeated under substantially identical conditions with the exception that a nickel-clad column affording the contact of only a nickel surface with the material undergoing fractionation is employed. The results obtained with the nickel-clad column are indicated in column B of the following table. The operations in the steel and nickel-clad column are again repeated under substantially identical conditions but with the exception that a substantially anhydrous feed (i. e. containing less than 20 P. P. M. of water) to each fractionator are employed. Results obtained in the steel and nickel-clad column under substantially anhydrous conditions are indicated in columns C and D, respectively of the following table:

| | A | B | C | D |
|---|---|---|---|---|
| Charge | Wet | Wet | Anhydrous | Anhydrous. |
| Column Surface | Steel | Nickel | Steel | Nickel. |
| Rate of Isopropyl Chloride Production in lbs. per 1,000 sq. ft. per hour. | 130 | 6.5 | 390 | 19.5. |
| Isopropyl Chloride Production, lbs. per day | 4,680 | 235 | 14,040 | 705. |
| Hydrogen Chloride Conversion, percent | 3 | 0.15 | 10 | 0.5. |

As stressed in the foregoing detailed description thereof, the invention is applied with particular advantage to the separation of a hydrogen halide such as hydrogen chloride from admixture with a normally gaseous olefinic hydrocarbon such as, for example, ethylene, propylene and the butylenes. It is to be understood, however, that the invention is in no wise limited in its application to the separation of a hydrogen chloride from normally gaseous olefins but may be applied to the separation of hydrogen chloride from other olefinic hydrocarbons which do not react spontaneously with hydrogen chloride such as, for example the amylenes, hexylenes, heptylenes, octylenes and their homologues. The invention is furthermore not limited to the resolution of olefin-containing mixtures comprising hydrogen chloride as the hydrogen halide but may be applied to the separation of mixtures comprising the olefinic hydrocarbon in admixture with another hydrogen halide such as, for example, hydrogen bromide or hydrogen fluoride.

The fractionating zone employed in the execution of the invention may comprise any of the many types of fractionators such as, for example, columns or stills equipped with suitable bubble cap plates, baffles, packing, or the like, substantially all surfaces of which coming into contact with the mixture undergoing fractionation consist essentially of nickel.

The olefin and hydrogen halide containing charge is introduced into the fractionating zone substantially in the liquid phase. The pressure maintained within the fractionating zone will of course vary to some degree with the composition of the charge and specific type of fractionator and operating methods employed. The pressure within the column is, however, maintained sufficiently high to assure the production of an overhead product consisting essentially of hydrogen halide.

We claim as our invention:

1. In a process for the separation of hydrogen chloride in a state of high purity from a mixture containing said hydrogen chloride in admixture with an olefin by fractionating said mixture at an elevated pressure, the improvement which comprises effecting said fractionation in a fractionating zone in which substantially all surfaces contacting said mixture undergoing fractionation are essentially only of nickel thereby effecting said fractionation in the absence of any substantial interaction of said hydrogen chloride and said olefin.

2. In a process for the separation of hydrogen chloride in a state of high purity from a mixture containing said hydrogen chloride in admixture with a normally gaseous olefin by fractionating said mixture at an elevated pressure, the improvement which comprises effecting said fractionation in a fractionating zone in which substantially all surfaces contacting said mixture undergoing fractionation are essentially only of nickel thereby effecting said fractionation in the absence of any substantial interaction of said hydrogen chloride and said olefin.

3. In a process for the separation of hydrogen chloride in a state of high purity from a mixture containing said hydrogen chloride in admixture with propylene by fractionating said mixture at an elevated pressure, the improvement which comprises effecting said fractionation in a fractionating zone in which substantially all surfaces contacting said mixture undergoing fractionation are essentially only of nickel thereby effecting said fractionation in the absence of any substantial interaction of said hydrogen chloride and said propylene.

4. In a process for the separation of hydrogen chloride in a state of high purity from a mixture containing said hydrogen chloride in admixture with an olefin by fractionating said mixture at an elevated pressure, the improvement which comprises effecting said fractionation in a fractionating zone in which substantially all surfaces contacting said mixture undergoing fractionation are essentially only of nickel, and maintaining traces of moisture in excess of about 20 parts per million in said mixture charged to said fractionating zone, thereby effecting said fractionation in the absence of any substantial interaction of said hydrogen chloride and said olefin.

5. In a process for the separation of hydrogen chloride in a state of high purity from a mixture containing said hydrogen chloride in admixture with a normally gaseous olefin by fractionating said mixture at an elevated pressure, the improvement which comprises effecting said fractionation in a fractionating zone in which substantially all surfaces contacting said mixture undergoing fractionation are essentially only of nickel, and maintaining a water content of from about 20 to about 200 parts per million in said mixture charged to said fractionating zone, thereby effecting said fractionation in the absence of any substantial interaction of said hydrogen chloride and said olefin.

6. In a process for the separation of a hydrogen chloride in a state of high purity from a mixture containing said hydrogen chloride in admixture with a normally gaseous olefin by fractionating said mixture at an elevated pressure, the improvement which comprises effecting said fractionation in a fractionating zone in which substantially all surfaces contacting said mixture undergoing fractionation are essentially only of nickel, and maintaining a water content of from about 20 to about 700 parts per million in said mixture charged to said fractionating zone, thereby effecting said fractionation in the absence of any substantial interaction of said hydrogen chloride and said olefin.

7. In a process for the separation of a hydrogen chloride in a state of high purity from a mixture containing said hydrogen chloride in admixture with a propylene by fractionating said mixture at an elevated pressure, the improvement which comprises effecting said fractionation in a fractionating zone in which substantially all surfaces contacting said mixture undergoing fractionation are essentially only of nickel, and maintaining a water content of from about 20 to about 700 parts per million in said mixture charged to said fractionating zone, thereby effecting said fractionation in the absence of any substantial interaction of said hydrogen chloride and said propylene.

8. In a process for separating hydrogen chloride from a mixture containing said hydrogen chloride in admixture with normally gaseous olefins consisting essentially of propylene by fractionating said mixture at an elevated pressure, the improvement which comprises effecting said fractionation in a fractionating zone in which substantially all surfaces contacting said mixture undergoing fractionation are essentially only of nickel, and maintaining traces of moisture in excess of about 20 parts per million in said mixture charged to said fractionating zone, thereby effecting said fractionation in the absence of any substantial interaction of said hydrogen halide and said olefin.

ALAN C. NIXON.
DAVID C. LEHWALDER.
HARRY A. CHENEY.

REFERENCES CITED

The following references are of record in the file of this patent:

UNITED STATES PATENTS

| Number | Name | Date |
|---|---|---|
| 2,227,953 | Baehr et al. | Jan. 7, 1941 |